United States Patent
Karivaradaswamy et al.

(10) Patent No.: US 11,455,942 B2
(45) Date of Patent: Sep. 27, 2022

(54) SYSTEMS AND METHODS FOR PROVIDING HUMAN INTERFACE DEVICE INFORMATION VIA A CAMERA SENSOR

(71) Applicant: Microsoft Technology Licensing, LLC, Redmond, WA (US)

(72) Inventors: Sathyanarayanan Karivaradaswamy, Sammamish, WA (US); Wenjie Shi, Sammamish, WA (US); Ziran Wu, Pomona, CA (US); Onji Bae, Seattle, WA (US); Michael Jeffrey Ajax, Bellevue, WA (US); Naveen Thumpudi, Redmond, WA (US); Karthik Elangovan, Seattle, WA (US); Andrew Wathen Quirk, Seattle, WA (US); Mei Ling Wilson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/112,561

(22) Filed: Dec. 4, 2020

(65) Prior Publication Data
US 2022/0180798 A1 Jun. 9, 2022

(51) Int. Cl.
*G09G 3/32* (2016.01)

(52) U.S. Cl.
CPC ....... *G09G 3/32* (2013.01); *G09G 2320/0626* (2013.01); *G09G 2360/144* (2013.01)

(58) Field of Classification Search
CPC ............. G09G 3/32; G09G 2320/0626; G09G 2360/144
See application file for complete search history.

(56) References Cited

U.S. PATENT DOCUMENTS

| 7,071,456 | B2 | 7/2006 | Poplin | |
| 8,238,968 | B1 * | 8/2012 | Frydman | H04W 52/027 455/556.1 |
| 8,493,446 | B2 | 7/2013 | Li et al. | |

(Continued)

FOREIGN PATENT DOCUMENTS

WO    2009055464 A2    4/2009

OTHER PUBLICATIONS

Kawadkar, Vishal, "Samsung to Use Front Camera as Ambient Light Sensor for Future Devices", Retrieved From: https://www.gizbot.com/mobile/news/samsung-use-front-camera-as-ambient-light-sensor-future-devices-055495.html, Nov. 19, 2018, 2 Pages.

(Continued)

*Primary Examiner* — Muhammad N Edun
(74) *Attorney, Agent, or Firm* — Ray Quinney & Nebeker P.C.; John O. Carpenter

(57) ABSTRACT

A method of providing environmental information to an electronic device includes, at the electronic device, receiving ambient light from a surrounding environment of the electronic device with one or more camera sensors in data communication with a processor and capturing a raw pattern with the camera sensor, wherein the raw pattern includes light intensity information and light spectrum information. The method further includes deriving at least one ambient light value from the light intensity information and light spectrum information and providing the ambient light value to the processor of the electronic device.

19 Claims, 8 Drawing Sheets

(56) References Cited

U.S. PATENT DOCUMENTS

| | | | |
|---|---|---|---|
| 8,872,093 B2 | 10/2014 | Lee et al. | |
| 2012/0092541 A1 | 4/2012 | Tuulos et al. | |
| 2012/0265482 A1* | 10/2012 | Grokop | G06F 1/1686 |
| | | | 702/141 |
| 2014/0118257 A1* | 5/2014 | Baldwin | G06F 3/038 |
| | | | 345/158 |
| 2015/0264241 A1 | 9/2015 | Kleekajai et al. | |
| 2017/0264833 A1* | 9/2017 | Barnes | H04N 5/23206 |
| 2018/0295704 A1* | 10/2018 | Haverlag | H05B 47/175 |
| 2020/0128225 A1* | 4/2020 | Ge | H04N 13/122 |
| 2020/0209398 A1* | 7/2020 | Kempf | G02B 27/286 |

OTHER PUBLICATIONS

Ma, et al., "Automatic Brightness Control of the Handheld Device Display with Low Illumination", In Proceedings of IEEE International Conference on Computer Science and Automation Engineering, May 25, 2012, pp. 382-385.

"International Search Report & Written Opinion Issued in PCT Application No. PCT/US2021/056957", dated Feb. 10, 2022, 12 Pages.

\* cited by examiner

SYSTEMS AND METHODS FOR PROVIDING HUMAN INTERFACE DEVICE INFORMATION VIA A CAMERA SENSOR

BACKGROUND

Background and Relevant Art

Most modern electronic devices include a backlit (such as a light emitting diode (LED) backlight) or self-emitting (such as an organic LED) electronic display. Such electronic displays have adjustable brightness and/or color profiles. The brightness and/or color profiles are user-selectable, of the brightness and/or color profiles of the electronic display are adjusted based on measurements made by ambient light sensors.

BRIEF SUMMARY

In some implementations, a method of providing environmental information to an electronic device includes, at the electronic device, receiving ambient light from a surrounding environment of the electronic device with a camera sensor in data communication with a processor and capturing a raw pattern with the camera sensor, wherein the raw pattern includes light intensity information and light spectrum information. The method further includes deriving at least one ambient light value from the light intensity information and light spectrum information and providing the ambient light value to the processor of the electronic device.

In some implementations, a camera sensor includes a pixel array and at least one photoreceptor. The pixel array includes a plurality of pixels, where each pixel includes at least two color channels. The photoreceptor is configured to measure lux value on a broad spectrum, wherein the broad spectrum includes the at least two color channels.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 1-2 is a rear perspective view of the electronic device of FIG. 1-1 with a rear-facing camera sensor, according to at least some implementations of the present disclosure;

FIG. 2 is a schematic illustration of a system architecture of a camera sensor, according to at least some implementations of the present disclosure;

FIG. 6-1 is an example spectrum of sunlight in which an electronic device may be used, according to at least some implementations of the present disclosure;

FIG. 6-2 is an example spectrum of cool white light emitting diode (LED) illumination in which an electronic device may be used, according to at least some implementations of the present disclosure;

FIG. 6-3 is an example spectrum of warm white light emitting diode (LED) illumination in which an electronic device may be used, according to at least some implementations of the present disclosure;

DETAILED DESCRIPTION

Figure 1:
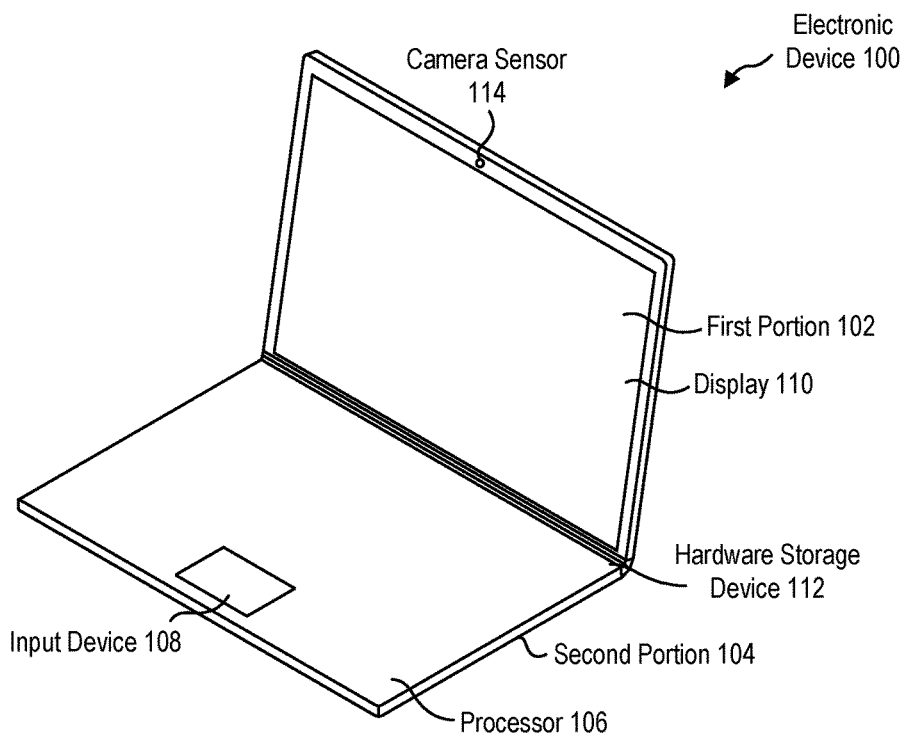
FIG. 1-1 is a perspective view of an electronic device with a camera sensor, according to at least some implementations of the present disclosure.

The present disclosure relates generally to systems and methods for providing environmental information to a processor and/or operating system of an electronic device. In some implementations, an electronic device includes a camera sensor and an electronic display. The electronic display can provide visual information to a user, including but not limited to text, such as correspondence, news articles, or literature; still images, such as drawings or photographs; videos, such as streamed videos, locally stored videos, or locally rendered videos or video information (such as a video game); or other visual information such as a flashing screen to indicate cadence or tempo for a musician or a user's heartrate during exercise. How and when the visual information is provided to a user may be dependent upon or related to the environmental conditions around the electronic display.

A user's perception of accurate reproduction of colors and brightness of the visual information is at least partially dependent upon ambient environmental conditions. For example, the brightness of the electronic display may be adjusted based upon an ambient environmental brightness. In another example, the color profile of the electronic display may be adjusted based upon an ambient chromaticity. For accurate color perception by a user, a color profile of the electronic display can be adjusted to compensate for the color of the ambient light in the user's environment. An example of such color profile adjustment may be performed when the electronic display is displaying visual information to a user in an environment primarily lit by evening sunlight; presenting a warm color temperature (e.g., 2000K color temperature) in the ambient environment. Conversely, color profile adjustment may be performed when the electronic display is displaying visual information to a user in an environment primarily lit by fluorescent lights; presenting a cool color temperature (e.g., 5000K color temperature). In each instance, the user's perception of the color reproduction of the electronic display is be affected by the amount and color of light in the ambient environment.

In some implementations, a camera sensor of the electronic device is used to measure ambient light brightness and/or chromaticity. The camera sensor may be integrated into electronic device, such as in the housing of the electronic device or in the bezel of the electronic display, or the camera sensor may be an external camera sensor in communication with the electronic device via a wired (e.g., USB, MIPI) or wireless (e.g., Bluetooth, WiFi) connection. The camera sensor may measure and/or calculate an ambient environmental light lux value and/or ambient environmental light chromaticity value, and the camera sensor may provide the lux value and/or chromaticity value to the processor and/or operating system of the electronic device. In at least one implementation, the camera sensor derives and provides the lux value and/or chromaticity value without capturing an image frame or without transmitting a captured image frame to the processor and/or operating system of the electronic device. In at least one implementation, the operating system itself might be in a dormant state (e.g., deep sleep, modern standby, or hibernation state) while the camera sensor is active. In such implementations, the electronic device can save power by allowing the camera sensor to detect changes in the environment and/or user presence without the processor and/or operating system being active or actively calling for the HID inputs from the camera sensor.

In some implementations, the electronic display is further adjusted based on user presence information provided by the camera sensor. For example, the camera sensor may receive light to adjust the display settings of the electronic display. In some examples, the camera sensor may determine the presence and/or location of a user relative to the electronic display and adjust the display settings of the electronic display based on the user presence information and/or user location information.

In at least one example, the camera sensor is configured to determine when a user is present immediately in front of the electronic display, and the camera sensor can provide user presence information to the electronic device to enable or unlock the electronic display. In another example, the camera sensor is configured to determine when a user is not present (i.e., when the user leaves) in front of the electronic display, and the camera sensor can provide user presence information to the electronic device to disable or lock the electronic display. In another example, the camera sensor is configured to determine if more than one user is present (to screen-lock or dim display to hide sensitive items on the display when an unintended person is viewing the display). In another example, the camera sensor can determine when a user is present, but not located immediately in front of the electronic display (e.g., when the user is located off-axis from a surface normal of the electronic display), and the camera sensor can provide user presence and location information to adjust the display settings of the electronic display to compensate for changes to the perceived display quality based on the user's off-axis viewing of the display.

FIG. 1 is a perspective view of an electronic device 100. In some implementations, the electronic device 100 is a portable electronic device, such as a laptop, a smartphone, a tablet computer, a hybrid computer, a wearable electronic device (e.g., a head-mounted device, a smartwatch, headphones) or other portable electronic device. In some implementations, the electronic device 100 is an electronic device that is conventionally operated in a fixed location, such as a television, home theater, desktop computer, projector, optical disc player (e.g., CD player, DVD player, BLURAY player), video game console, network camera (e.g., IP camera, ONVIF camera), or other electronic device.

FIG. 1-1 illustrates an implementation of a laptop electronic device 100. The electronic device 100 includes a first portion 102 and a second portion 104 movably connected to one another. In implementations in which the electronic device is a hybrid computer, the first portion 102 includes the electronic display 110 and at least a processor 106. In some implementations, a processor 106 is located in the second portion 104. In some implementations, the first portion 102 of the electronic device 100 includes an electronic display 110 to present visual information to a user and the second portion 104 of the electronic device 100 includes one or more input devices 108, such as a trackpad, a keyboard, etc., to allow a user to interact with the electronic device 100. In further implementations, the first portion 102 and the second portion 104 include electronic displays 110, one or more of which can function as an input device 108. The electronic device 100 further includes additional computer components, such as system memory, a graphical processing unit, graphics memory, speakers, one or more communication devices (such as WIFI, BLUETOOTH, near-field communications, cellular), an integrated camera sensor 114, peripheral connection points (e.g., USB to connect an external camera sensor), hardware storage device(s) 112, etc. In some implementations, the first portion 102 is removable from the second portion 104.

In some implementations, the hardware storage device 112 is a solid-state storage medium. In some examples, the hardware storage device 112 is a volatile storage medium, such as dynamic random-access memory (DRAM). In other examples, the hardware storage device 112 is a non-volatile storage medium, such as electrically erasable programmable read-only memory or flash memory (NAND- or NOR-type). In some implementations, the hardware storage device 112 is a platen-based storage medium, such as a magnetic platen-based hard disk drive. In some implementations, the hardware storage device 112 is an optical storage medium, such as a compact disc, digital video disc, BLURAY disc, or other optical storage format.

In the example illustrated in FIG. 1-1 and in other examples, it is desirable that electronic devices be thin and light for transport, while remaining powerful and efficient during use. The inclusion of unneeded components increases power consumption and thermal energy generation, which then may require additional power storage and/or thermal management, further increasing the size and weight of the electronic device. Thermal energy generated by the electronic device 100, therefore, has little unobstructed volume inside the first portion 102 and/or second portion 104 through which air can flow. In some implementations, an active thermal management device with an impeller is used to actively move air in, out, or through the first portion 102 and/or second portion 104. Simplifying the components of the electronic device can save more space, power, and thermal energy than the removal of a component, alone. As such, allowing the camera sensor 114 to provide environmental information, such as lux values, chromaticity values, user presence information, user location information, or other environmental information to the processor 106 can remove components from the electronic device while the changes remain transparent to the existing human interface device (HID) calls and communications to and from the operating system.

In some implementations, the electronic device includes a second camera sensor. For example, an electronic device may have a plurality of front-facing camera sensors, such as zoom/telephoto camera sensors or RGB/IR camera sensors. In some examples, a camera sensor may be a rear-facing camera sensor 116, as shown in the rear perspective view of the electronic device 100 in FIG. 1-2. In some implementations, the electronic device has a plurality of camera sensors, and the processor 106 and/or operating system of the electronic device may transmit a request to and/or receive information from any one of the camera sensors regarding environmental information. In some implementations, both the front-facing camera sensor (i.e., camera sensor 114) and a rear-facing camera sensor 116 provide environmental information to the processor 106 and/or operating system.

In some implementations, the rear facing camera may measure or capture light that is in the user's field of view that cannot be measured or captured by a front-facing camera sensor. For example, a user may be sitting at a desk near a window, with a laptop computer on the surface of the desk. A front-facing camera sensor may be oriented to measure light information from the environment in the room in which the user is sitting, while the rear-facing camera sensor may be oriented to measure the light originating from a light source behind the electronic device (e.g., on an opposite side of the electronic device from the electronic display). The rear-facing camera sensor (or a combination of a rear-facing camera sensor and the front-facing camera sensor) can allow the electronic device to determine when the electronic display is backlit by a light source that is not visible to the front-facing camera sensor.

Camera sensors conventionally capture an image frame for processing by the camera firmware and/or by software of the electronic device. However, image frame capture can consume more power and generate more thermal energy than is necessary. In some implementations, a camera sensor according to the present disclosure includes firmware that enables discrete camera function and light sensing function. For example, the camera function may allow image capture at native or binned resolutions of the camera sensor. The captured image frame(s) can then be processed and provided to image or video capture applications loaded on and/or executed by the electronic device.

In other examples, the sensor function allows for a simplified light measurement, in which the camera sensor measures the ambient environmental light and calculates a lux value, a chromaticity value, or another environmental value. The environmental value can then be provided to the processor and/or operating system of the electronic device without requiring the processing and/or bandwidth to communicate a captured image. In other words, the environmental information can be extracted or calculated from the collected light without saving an image, reducing the system resources necessary to measure ambient environmental information.

Figures 1, 2:
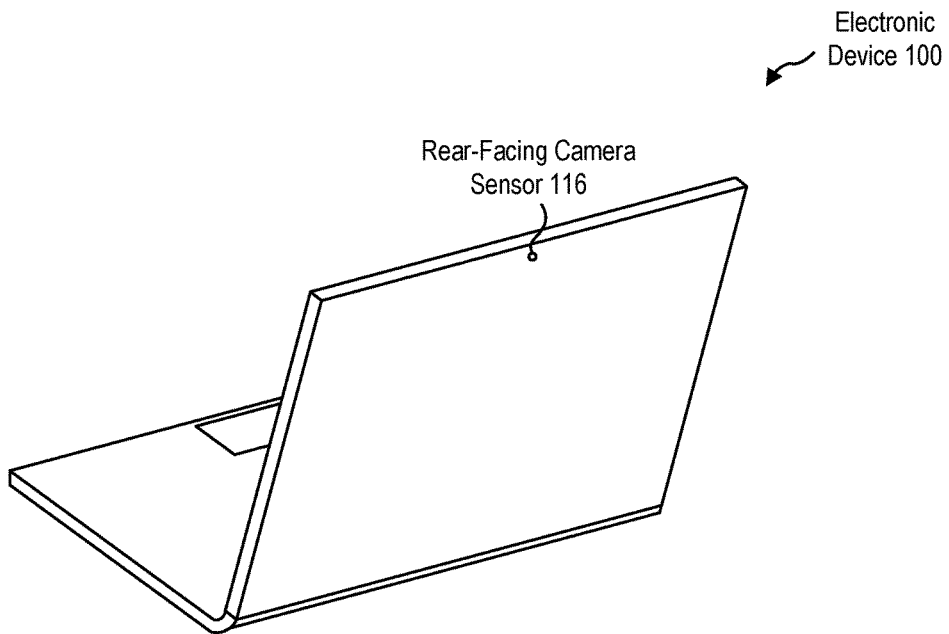
Figure 2:
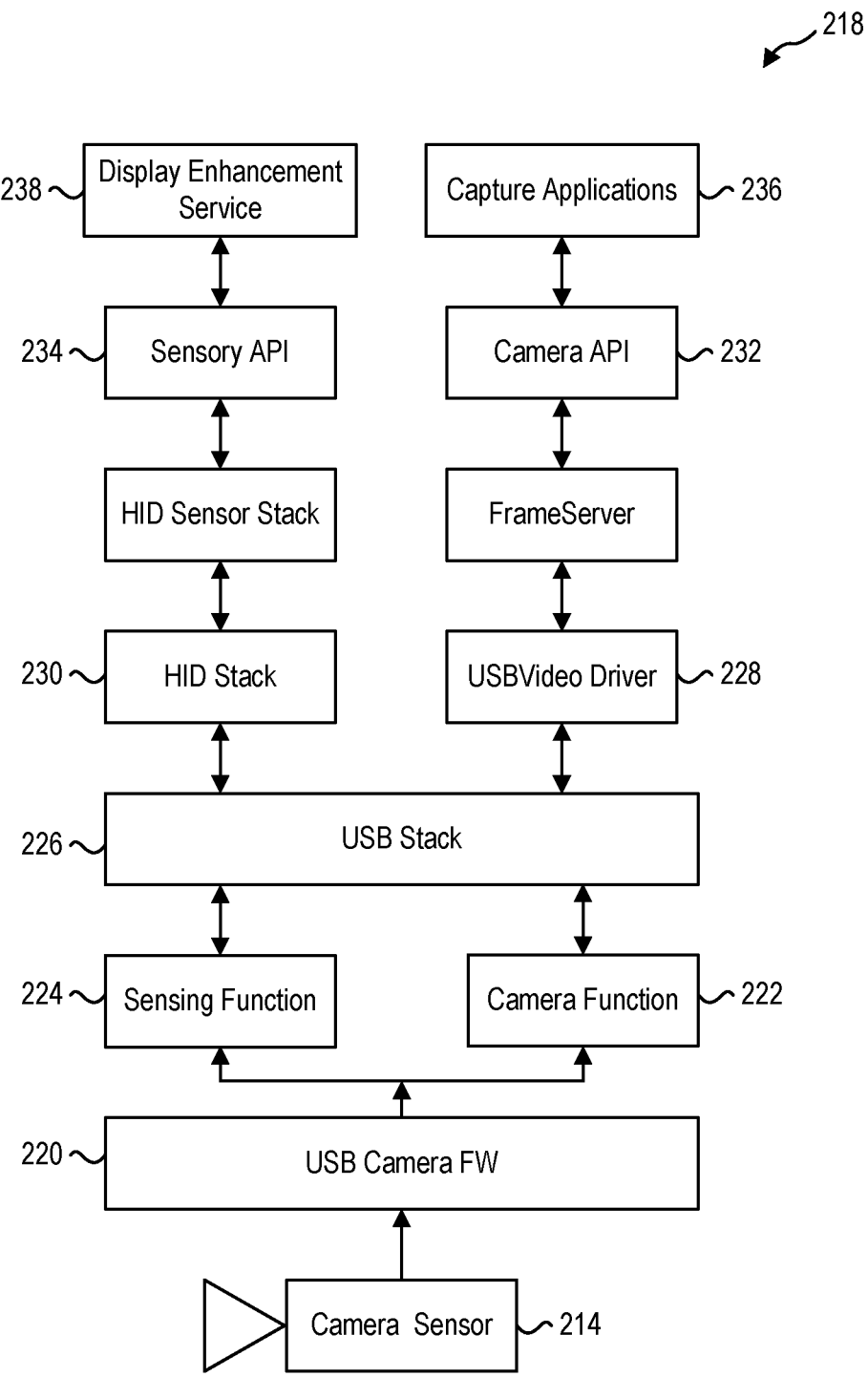

FIG. 2 illustrates an implementation of one architecture 218 for a camera sensor 214 (e.g., the camera sensor 114 or rear-facing camera sensor 116 of FIGS. 1-1 and 1-2) including both camera functions 222 and HID sensing function 224. In the illustrated implementation, the camera sensor is a USB camera, but in other implementations, the camera sensor may include one or more integrated camera sensors. The architecture 218 includes the Camera firmware 220 to provide control over the function of the camera sensor 214 hardware. The firmware 220 includes discrete camera function 222 and sensing function 224 sets.

In some implementations, the camera function 222 and sensing function 224 communicate with the USB stack 226, which in turn, has a discrete Video Driver 228 and a HID stack 230. The Video Driver 228 receives image frames from the camera sensor and, via a server and camera API 232, communicates the image frames from the camera sensor 214 to one or more capture applications 236 via the processor and/or operating system of the electronic device.

Conversely, the sensing function 224 is in communication with a Display enhancement service 238 through the HID stack 230 and the Sensor API 234. By providing a discrete sensing function 224 that is in communication with an HID stack 230, the camera sensor 214 can replace an ambient light sensor (ALS) and/or an ambient chromaticity sensor (ACS) while communicating through the same sensors API 234 to the display enhancement service 238. From the perspective of the display enhancement service 238, there is no change as to whether the environmental information provided through the sensors API 234 is originating from a conventional ALS or from an implementation of a camera sensor 214 with sensing function 224 in its firmware 220, according to the present disclosure.

Figure 3:
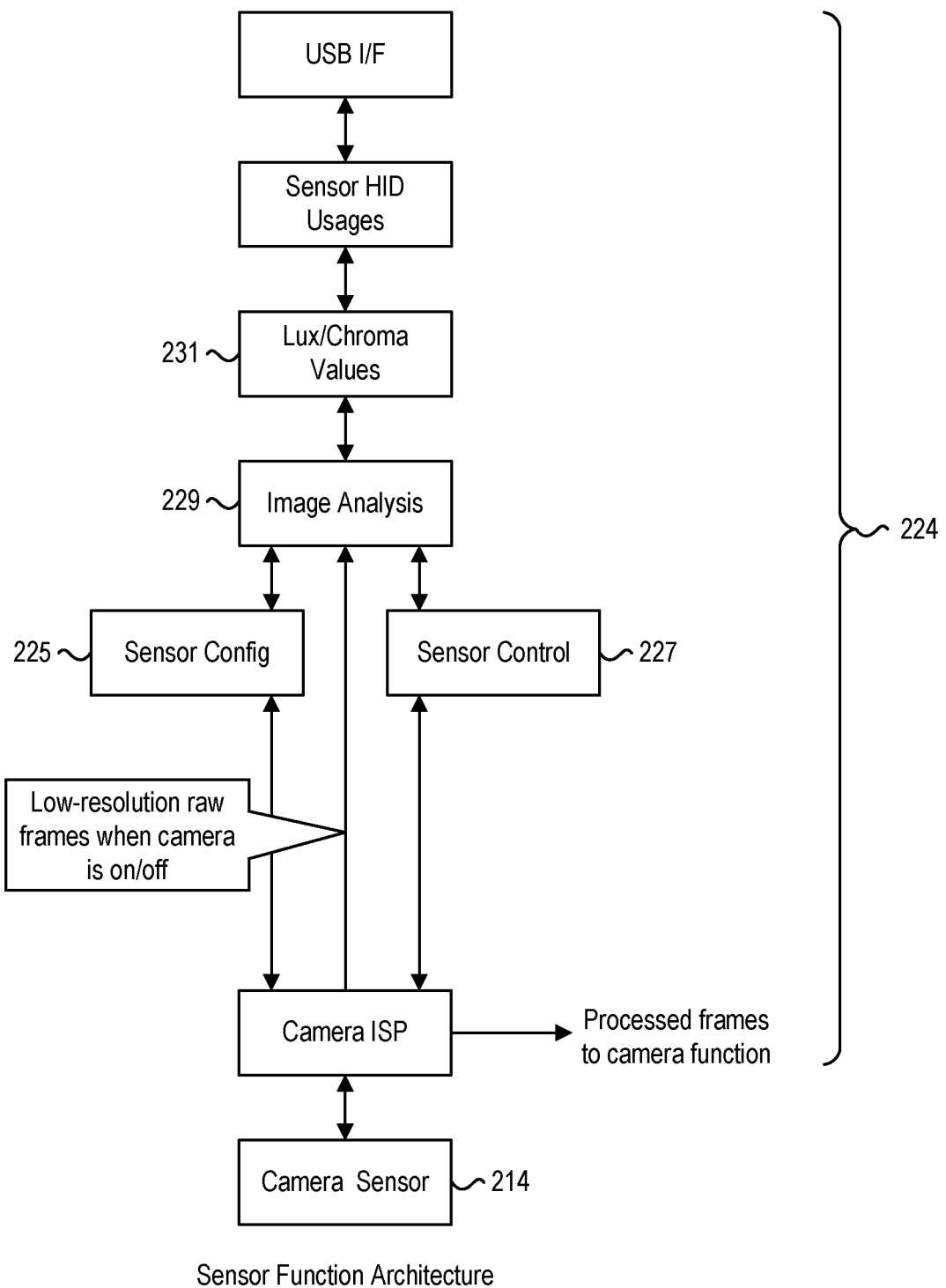
FIG. 3 is a schematic illustration of an architecture of a sensing function of the camera sensor of FIG. 2, according to at least some implementations of the present disclosure.

FIG. 3 is a schematic diagram of the architecture of the sensing function 224, independent of the camera function 222. In some implementations, the sensing function 224 can operate while the camera function 222 of the camera sensor 214 is inactive or disabled. The sensing function 224 includes the sensor configuration 225 and the sensor control 227. The sensor configuration 225 of the sensing function 224 may be different from the camera sensor configuration or settings when operating under the camera function. The sensing function 224 may use only some pixels, a longer exposure time, or different color channels compared to the camera function.

The sensing function 224 further includes an image analysis 229 to process the raw Bayer (or other) pattern collected by the sensor control 227. The image analysis 229 may yield the ambient light values 231, such as a lux value or chromaticity value that can be reported to the processor and/or operating system through a communication interface. By processing the raw pattern at the camera sensor, the sensing function 224 allows the camera sensor to provide HID functionality to the electronic device in a manner that is transparent to the processor and/or operating system.

Figure 4:
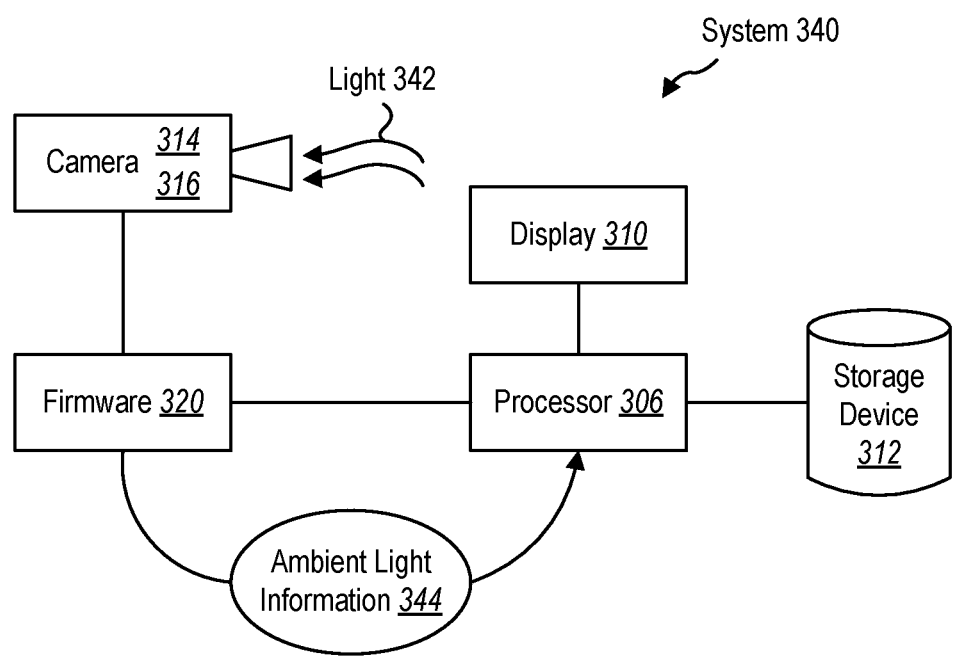
FIG. 4 is a schematic illustration of electronic device with a camera sensor, according to at least some implementations of the present disclosure.

FIG. 4 is a schematic diagram illustrating communication between electronic components of the electronic device, according to some implementations of the present disclosure. The system 340 includes at least one camera sensor 314, 316 controlled by firmware 320. The firmware 320 controls the hardware of the at least one camera sensor 314, 316 to measure ambient light 342 and derive ambient light information 344. The ambient light information 344 is then provided to the processor 306 and/or operating system through the Sensor APIs. Subsequently, the processor 306 can adjust the display settings of the electronic display 310 based upon a display enhancement service stored on the storage device 312 in data communication with the processor 306. In some implementations, the storage device 312 contains instructions thereon that, when executed by the processor 306, cause the electronic device to perform any of the methods described herein.

In at least one implementation, the firmware 320 of the at least one camera sensor 314, 316 sets a measurement interval or timing that dictates how frequently the at least one camera sensor 314, 316 measures the ambient light 342. In some implementations, the processor 306 communicates with the firmware 320 to set the measurement interval or to trigger a measurement on request from the processor 306 and/or operating system.

Figure 5:
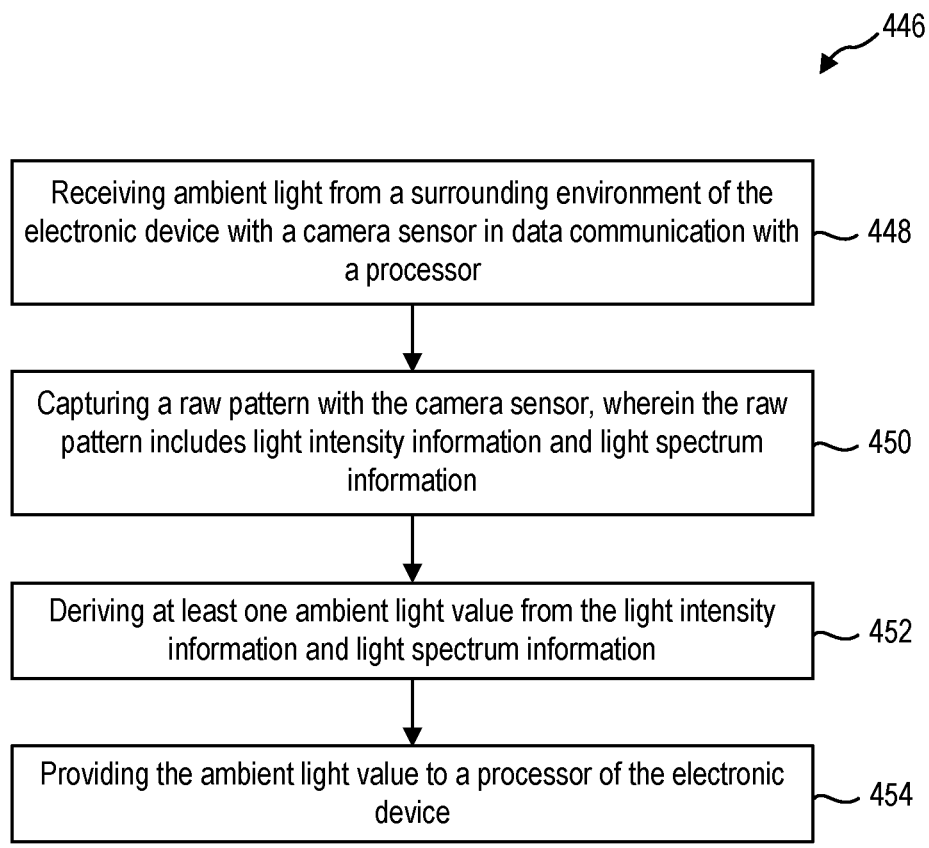
FIG. 5 is a flowchart illustrating a method of providing environmental information to an electronic device using a camera sensor, according to at least some implementations of the present disclosure.

FIG. 5 is a flowchart illustrating an implementation of a method of providing environmental information to a processor and/or operating system of an electronic device. In some implementations, a method of providing environmental information to a processor and/or operating system of an electronic device includes receiving ambient light from a surrounding environment of the electronic device with a camera sensor in data communication with a processor (448). The camera sensor can be an integrated camera sensor or external camera sensor, and the camera sensor may be one of a plurality of camera sensors. In at least one example, a first camera sensor and a second camera sensor are position on opposite sides of the electronic device to receive ambient light from different directions. In some implementations, the processor is a central processing unit (CPU) of the electronic device. In some implementations, the processor is device controller for the display and is configured to execute a display enhancement service.

The method 446 continues by capturing a raw pattern (Bayer or other) with the camera sensor, wherein the raw pattern includes light intensity information and light spectrum information (450) and deriving at least one ambient light value from the light intensity information and light spectrum information (452). In some implementations, capturing the raw pattern includes measuring light information using the entire pixel array of the camera sensor. In some implementations, capturing the raw pattern includes measuring light information using less than the entire pixel array of the camera sensor. For example, capturing the raw pattern may include using 50% or less of the entire pixel array. In other examples, capturing the raw pattern may include using 33% or less of the entire pixel array. In some implementations, only a subset of pixels are active and measuring ambient light when the raw pattern is captured.

The light intensity information may measure the brightness of the ambient light and derive an ambient light value from the nominal peak lux value measured. In some implementations, a plurality of camera sensors is used to measure the light intensity information, and the method may further include deriving an ambient light value by comparing the light intensity information from each of the cameras to determine a relative direction of the ambient light. In such implementations, it may be possible to determine when a display is backlit by an ambient light source, such as when a user is sitting in front of a window, and the method may include selecting or setting the lux value based upon the greater value of the plurality of measured light intensity information.

In some implementations, the light spectrum information may include color temperature. In some implementations, the light spectrum information may include a full visible light spectrum. The visible light spectrum may be binned by color. For example, the visible light spectrum may be binned into seven bins, such as red, orange, yellow, green, blue, indigo, and violet, and the relative intensity of each color may be reported. In some examples, the visible light spectrum may be binned into a quantity of bins based on the color channels of the electronic display, such as red, green, and blue. In at least one example, an ambient light value is a peak spectrum value that reports the color with the greatest intensity.

The method 446 further includes providing the ambient light value to a processor of the electronic device (454). In some implementations, the ambient light value is reported to the processor by the camera sensor (and the firmware associated with the camera sensor) without transmitting a captured image frame or other visual information. By reporting only the ambient light value, environmental information can be provided to the processor while requiring comparatively little system resources, and the camera sensor can maintain privacy by not retaining or transmitting an image which may contain the user or other individuals.

In at least one implementation, the ambient light value is used by the processor or operating system of the electronic device to adjust a display setting of the electronic display. For example, an ambient light value may be used to adjust the brightness of the electronic display to be commensurate with the lux value of the environment. In the example of a backlit electronic device described herein, the ambient light value provided by the camera sensor(s) may be used by the display enhancement service or other application or module in the operating system to increase the brightness of the electronic display beyond the ambient brightness of the room to help the user see the visual information provided on the electronic display, despite a bright light source positioned behind the electronic device.

The brightness values can be binned or bucketed brightness values that communicate a lux value that is within one of a plurality of bins for the brightness value. The camera sensor can report the bin of the ambient lux value to the processor and/or operating system instead of or in addition to the nominal lux value. The binned value can be used by the processor or operating system to set a display brightness to one of a matching plurality of bins for the display brightness.

Figures 1, 6:
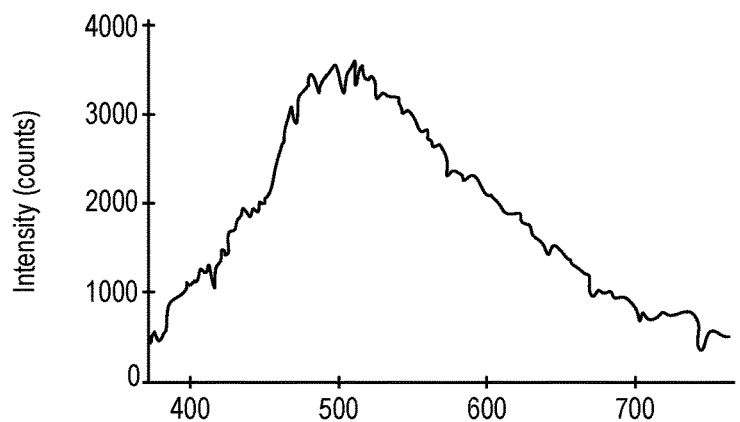
Figures 2, 6:
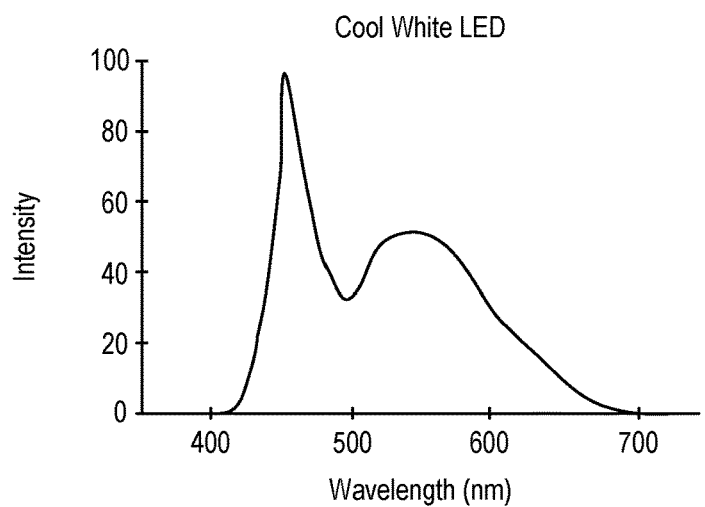
Figures 3, 6:
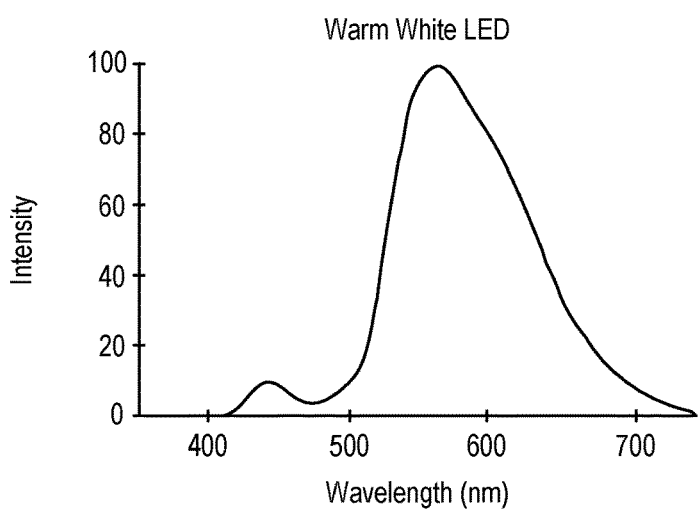

In some implementations, the ambient light value may be used to adjust one or more color channels of the electronic display. For example, the color balance of the electronic display may be adjusted to match or more closely match the spectrum of the ambient light. FIG. 6-1 is an example of a sunlight spectrum. The predominant color in the sunlight spectrum is green with comparatively less red and blue in the spectrum. A user's vision may adjust to the ambient color balance, and color perception of visual information presented on the electronic display may be affected.

For example, when the user and electronic device move from an outdoor space into an indoor environment that is illuminated by cool white light emitting diodes (LEDs) with the cool spectrum illustrated in FIG. 6-2, a color balance of the electronic display intended for viewing while in the sunlight spectrum ambient light may reproduce the red and green color channels at too high of a relative value. When the chromaticity values of the ambient light value indicates that the electronic device is in a cool white environment, the color balance of the electronic display may shift to reproduce the blue color channels at a higher level to generate color reproduction relative to the environment in a manner that the user perceives as accurate color reproduction. Similarly, a warm white LED spectrum, such as shown in FIG. 6-3 underrepresents the blue portion of the spectrum relative to the sunlight spectrum. As such, the electronic display may adjust the color balance of the electronic display to more closely approximate the spectrum of the ambient environment.

Figure 7:
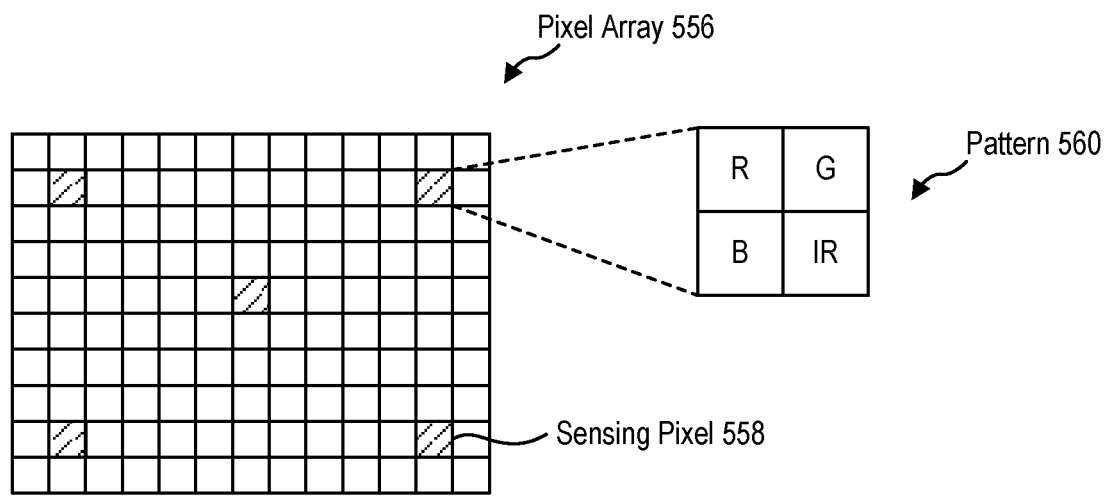
FIG. 7 is a front view of a camera sensor pixel array, according to at least some implementations of the present disclosure.

As the sensing function of the camera sensor does not require a full image capture, energy and resources can be saved by operating less than the full pixel array of the camera sensor. As described herein, in some implementations, less than 100%, less than 50%, less than 33%, or less than 25% of the pixel array may be used. In other implementation, a camera sensor pixel array may include dedicated sensing pixels embedded in the array that may be selectively operated independently from the image capture pixel array. FIG. 7 is a schematic representation of a 13×10 image capture pixel array 556 with five sensing pixels 558 embedded in the pixel array. In some implementations, the sensing pixels 558 have a different pattern 560 than the pixels used in the image capture array 556. For example, the sensing pixels 558 may include an infrared color channel in addition the typical red, green, and blue color channels. In at least one example, at least one of the sensing pixels 558 is a single broad spectrum photoreceptor that receives and measures ambient light across at least two visible or invisible color channels, including but not limited to red, green, blue, infrared, ultraviolet, magenta, yellow, cyan, etc. In some implementations, the camera sensor and/or the sensing pixels of the camera sensor are configured to capture at the low resolution, low power capture when the full pixel array of the camera sensor is not in active use to capture images. When the camera is in use, the full resolution capture may happen, and the ambient light values can be derived from the captured image frames.

Figure 8:
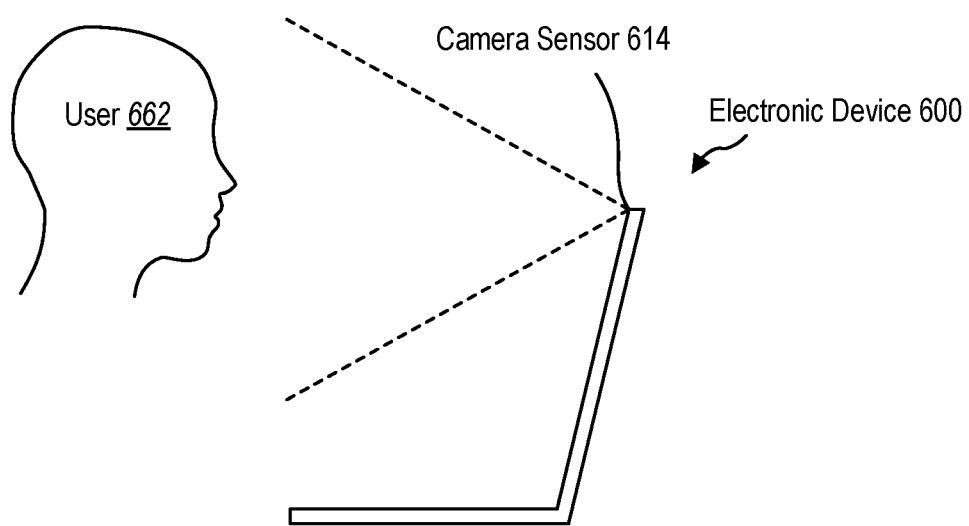
FIG. 8 is a schematic illustration of presence sensing using a camera sensor, according to at least some implementations of the present disclosure.

The camera sensor may, in addition to, or in alternative to lux and chromaticity value measurements, provide HID presence detection for the electronic device. FIG. 8 illustrates an example of presence detection when a user 662 is positioned in front of an electronic device 600 with a camera sensor 614 according to the present disclosure. In some implementations, the camera sensor 614 includes a sensing function that captures an image frame and processes the image frame to determine the presence of a human user 662. In some implementations, the presence sensing function evaluates the image frame for the presence of a human face. A low-resolution image may be used to determine presence information. For example, an image frame captured by the presence sensing function may be less than 64×64 pixels. In some implementations, the image frame captured by the presence sensing function is less than 48×48 pixels.

The presence sensing function may use edge detection to determine the shape of the user's head and/or facial features to identify the presence of a human user 662. In some implementations, the presence sensing function may capture a plurality of image frames and compare a first image frame to a second image frame to check for movement of the user. If movement of the suspected user 662 relative to the camera sensor 614 is not detected, the shape in the captured image may not be a human user 662. Movement checks can limit false positives in the presence sensing.

In some implementations, the presence information is provided to the processor and/or operating system to selectively enable/disable the electronic display or unlock/lock the electronic display when the electronic display is also an input device, as described in relation to FIG. 1-1. The presence information can enable automatic enabling/disabling or unlocking/locking of the electronic display in response to a user approaching the electronic device (e.g., sitting down at their desk or laptop) and leaving to the electronic device (e.g., leaving the desk or placing the laptop aside), respectively. As the presence sensing may be occurring while the device is inactive, operating the presence sensing in the camera sensor with low-resolution image capture allows the electronic device to use the low-power silicon device(s) or controller(s) of the camera sensor instead of consuming more power using the CPU via the I/O of the camera sensor.

In at least some implementations, the location of the user can be included in the presence sensing. For example, the perceived color reproduction and perceived brightness of some electronic displays is related to the viewing angle. Off-axis viewing by a user can produce chromatic shifts in the light that is observed by the user, and the user may experience reduced overall brightness from the electronic display.

Figure 9:
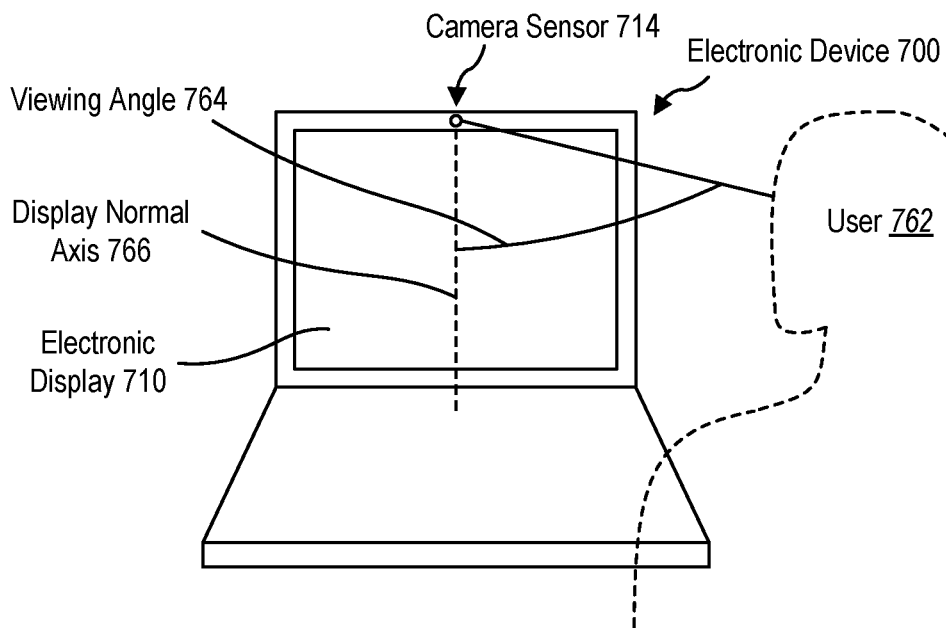
FIG. 9 is a schematic illustration of user location sensing using a camera sensor, according to at least some implementations of the present disclosure.

FIG. 9 is a schematic example of off-axis viewing of an electronic display 710 by a user 762. The camera sensor 714 of the electronic device 700 may operate in a sensing function to detect the presence and location of the user 762. When a user presence is detected at an off-axis viewing angle 764, the camera sensor 714 may provide a HID input to the processor and/or operating system of the electronic device 700 to adjust the color balance and/or brightness of the electronic display 710.

Figure 10:
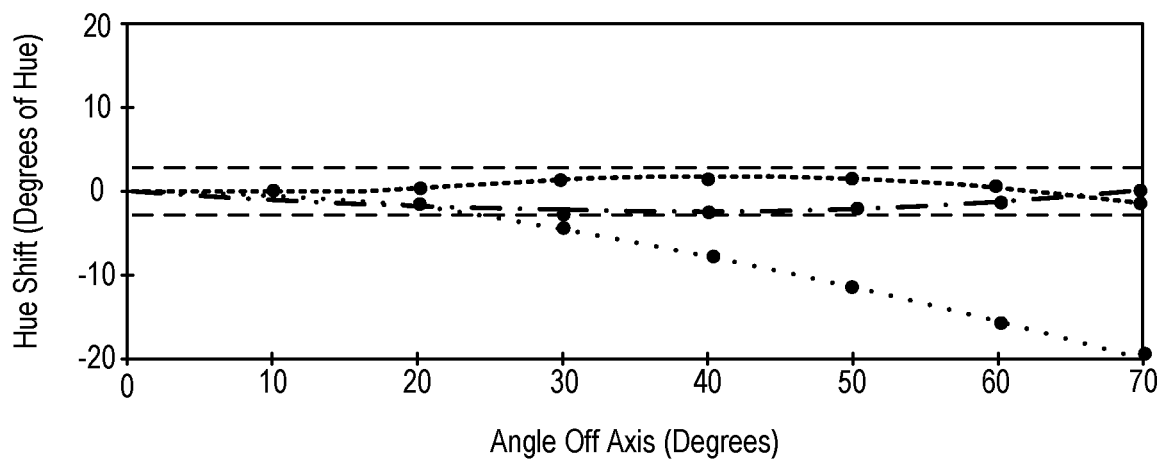
FIG. 10 is a graph illustrating off-axis chromatic shifts in a vertical alignment LED electronic display.

In some implementations, the display enhancement service or other application on the electronic device may adjust the color balance relative to the viewing angle, with greater shifts in the color balance associated with increases in the viewing angle relative to the display normal axis 766. For example, some electronic displays will appear to have a chromatic shift as the viewing angle changes. Vertical alignment LED displays exhibit a loss of blue hues in the color balance as the viewing angle increases off-axis, as shown in FIG. 10. When a user is detected at a location off-axis, the color balance of the electronic display may be adjusted to increase the blue color channel to compensate for the chromatic shift.

Referring again to FIG. 9, in some implementations, the display enhancement service or other application on the electronic device may adjust the brightness relative to the viewing angle, with greater increases in the brightness associated with increases in the viewing angle relative to the display normal axis 766. For example, some electronic displays will appear to dim as the viewing angle changes. When a user is detected at a location off-axis, the color balance of the electronic display may be adjusted to increase the brightness to compensate for the chromatic shift.

Camera sensors according to the present disclosure include firmware with sensing functions that allow the camera sensors to function as and/or replace HID input devices, such as an ALS, ACS, presence sensor, or other HID devices. The electronic device may communicate with the camera sensor as though it were the conventional HID device, rendering the sensing function of the camera sensor transparent to the processor and/or operating system of the electronic device while reducing power consumption, improving thermal management, and requiring less volume and mass in the electronic device.

INDUSTRIAL APPLICABILITY

The present disclosure relates generally to systems and methods for providing environmental information to a processor and/or operating system of an electronic device. In some implementations, an electronic device includes a camera sensor and an electronic display. The electronic display can provide visual information to a user, including but not limited to text, such as correspondence, news articles, or literature; still images, such as drawings or photographs; videos, such as streamed videos, locally stored videos, or locally rendered videos or video information (such as a video game); or other visual information such as a flashing screen to indicate cadence or tempo for a musician or a user's heartrate during exercise. The visual information provided to a user may be dependent upon or related to a brightness or color of the visual information.

A user's perception of accurate reproduction of colors and brightness of the visual information is at least partially dependent upon ambient environmental conditions. For example, the brightness of the electronic display may be adjusted based upon an ambient environmental brightness. In another example, the color profile of the electronic display may be adjusted based upon an ambient chromaticity. For accurate color perception by a user, a color profile of the electronic display can be adjusted to compensate for the color of the light in the user's environment. An example of such color profile adjustment may be performed when the electronic display is displaying visual information to a user in an environment primarily lit by evening sunlight, presenting a warm color temperature (e.g., 2000K color temperature) in the ambient environment. Conversely, color profile adjustment may be performed when the electronic display is displaying visual information to a user in an environment primarily lit by fluorescent lights, presenting a cool color temperature (e.g., 5000K color temperature). In each instance, the user's perspective of the color reproduction of the electronic display can be affected by the amount and color of the ambient environment.

In some implementations, a camera sensor of the electronic device is used to measure ambient light brightness and/or chromaticity. The camera sensor may be integrated into electronic device, such as in the housing of the electronic device or in the bezel of the electronic display, or the camera sensor may be an external camera sensor in communication with the electronic device via a wired (e.g., USB) or wireless (e.g., Bluetooth) connection. The camera sensor may measure and/or calculate an ambient environmental light lux value and/or ambient environmental light chromaticity value, and the camera sensor may provide the lux value and/or chromaticity value to the processor and/or operating system of the electronic device. In at least one implementation, the camera sensor provides the lux value and/or chromaticity value without capturing an image frame or without transmitting a captured image frame to the processor and/or operating system of the electronic device.

In some implementations, the electronic display is further adjusted based on user presence information provided by the camera sensor. For example, the camera sensor may calculate or measure ambient environmental light to adjust the display settings of the electronic display. In some examples, the camera sensor may determine the presence and/or location of a user relative to the electronic display and adjust the display settings of the electronic display based on the user presence information and/or user location information.

The present disclosure relates to systems and methods for providing ambient and/or environmental information to a processor and/or operating system of an electronic device according to at least the examples provided in the sections below:

(A1) In one aspect, some implementations include a method of providing information to an electronic device including receiving ambient light from a surrounding environment of the electronic device with a camera sensor in data communication with a processor; capturing a raw pattern with the camera sensor, wherein the raw pattern includes light intensity information and light spectrum information; deriving at least one ambient light value from the light intensity information and light spectrum information; and providing the ambient light value to a processor of the electronic device. The ambient light value can include information that the processor can then use to adjust the display settings of an electronic display to better provide visual information to a user.

(A2) In some instances, the method of (A1) includes deriving a lux value of the surrounding environment and providing the lux value in the ambient light value. The lux value may be used by the processor to adjust the brightness of the display for clarity and comfort of the user's viewing experience.

(A3) In some instances, the method of (A1) or (A2) includes deriving a chromaticity value of the surrounding environment and providing the chromaticity value in the ambient light value. The chromaticity value may be used by the processor to adjust the color profile or color balance of the electronic display for clarity and comfort of the user's viewing experience.

(A4) In some implementations, the method of any of (A1) through (A3) includes deriving the ambient light value without processing a captured image frame. The sensing function of the camera sensor can allow the ambient light values to be derived or calculated without necessitating the power consumption or system resources of image processing on a full image frame.

(A5) In some implementations, the method of any of (A1) through (A4) includes deriving the ambient light value without capturing a fully resolution image frame. The sensing function of the camera sensor can allow the ambient light values to be derived or calculated without necessitating the power consumption or system resources of capturing a full resolution image frame. For example, the ambient light value can be calculated from a raw pattern collected from the pixel array of the camera sensor.

(A6) In some implementations, the method of any of (A1) through (A5) uses less than 50% of the pixels of the full pixel array of the camera sensor.

(A7) In some implementations, the camera sensor of any of the methods of (A1) through (A6) is located on an opposite side of the electronic device from the electronic display. For example, a front-facing camera sensor (e.g., user-facing) images the user's surrounding environment, but a rear-facing camera sensor allows for imaging of the background environment behind the electronic display being viewed by the user.

(A8) In some implementations, the method of any of (A1) through (A7) includes the camera sensor capturing a raw pattern in response to a call from an operating system of the electronic device.

(A9) In some implementations, the method of any of (A1) through (A8) includes deriving the ambient light value at the camera sensor. By deriving the ambient light value at the camera sensor, the electronic device can offload computations onto the camera sensor and utilize lower energy consumption hardware.

(A10) In some implementations, the method of any of (A1) through (A9) includes deriving the ambient light value at the camera sensor, and the raw pattern is not provided to the processor of the electronic device with the ambient light value.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to implementations disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of providing environmental information to an electronic device, the method comprising:
   at the electronic device:
      receiving ambient light from a surrounding environment of the electronic device with a camera sensor that includes a pixel array in data communication with a processor;
      capturing a raw pattern with the camera sensor, wherein the raw pattern includes light intensity information and light spectrum information and wherein capturing the raw pattern includes using less pixels than the entire pixel array;
      deriving at least one ambient light value from the light intensity information and light spectrum information; and
      providing the ambient light value to the processor of the electronic device.

2. The method of claim 1, wherein ambient light value is a lux value of the surrounding environment.

3. The method of claim 1, wherein the light spectrum information is a chromaticity value of the surrounding environment.

4. The method of claim 1, further comprising adjusting at least one display parameter of an electronic display of the electronic device based on the ambient light value.

5. The method of claim 4, wherein the ambient light value is a chromaticity value, and the chromaticity value is used to adjust a color profile of the electronic display.

6. The method of claim 4, wherein the ambient light value is a lux value, and the lux value is used to adjust a brightness of the electronic display.

7. The method of claim 1, wherein the ambient light value is derived from a scrambled image frame.

8. The method of claim 1, wherein the camera sensor does not capture a full resolution image when capturing the raw pattern.

9. The method of claim 1, wherein an operating system of the electronic device is dormant while the ambient light value is derived.

10. The method of claim 1, wherein the camera sensor is located on an opposite side of the electronic device from an electronic display.

11. The method of claim 1, wherein the camera sensor captures the raw pattern in response to a call from an operating system of the electronic device.

12. The method of claim 1, wherein deriving the ambient light value is performed at the camera sensor, and the raw pattern is not provided to the processor of the electronic device with the ambient light value.

13. A camera sensor, the camera sensor comprising:
   a pixel array including a plurality of pixels, each pixel in the plurality of pixels including at least two color channels; and
   at least one sensing pixel embedded in the pixel array, the sensing pixel having a different pattern than the pixels of the pixel array that includes at least one photoreceptor that is configured to measure lux value on a broad spectrum, wherein the broad spectrum includes the at least two color channels.

14. The camera sensor of claim 13, wherein the at least one photoreceptor includes an infrared channel.

15. The camera sensor of claim 13, wherein the pixel array is configured to capture an image frame, and at least one photoreceptor measures lux value independently of the pixel array capturing an image frame.

16. A method of providing environmental information to an electronic device, the method including:
   at a camera sensor:
      receiving ambient light from a surrounding environment of the electronic device with a camera sensor in data communication with a processor;
      capturing at least one image frame with the camera sensor, wherein the image frame is no more than 64 pixels by 64 pixels and the image frame has a resolution less than a resolution of the camera sensor;

determining, based on the at least one image frame, user presence information of a human user; and providing the user presence information to a processor of the electronic device.

17. The method of claim 16, wherein the at least one image frame includes a plurality of image frames and determining user presence information includes comparing a first image frame to a second image frame to identify movement of a human user in a field of view of the camera sensor.

18. The method of claim 16, wherein determining user presence information is performed at the camera sensor.

19. The method of claim 16, wherein the image frame is not provided to the processor with the user presence information.

* * * * *